A. T. WRIGHT.
Bee Hive.
No. 65,522.
Patented June 4, 1867.
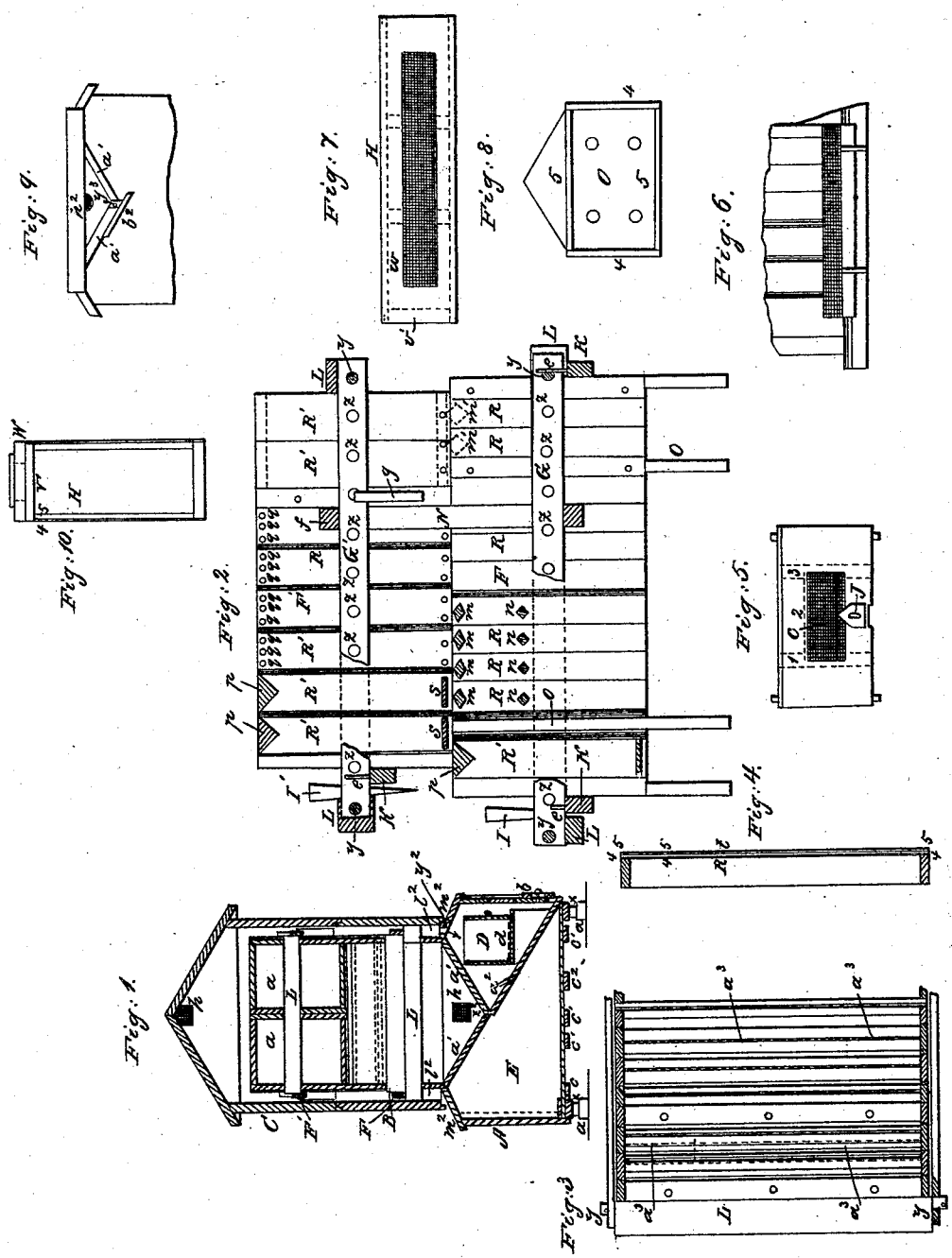

United States Patent Office.

A. T. WRIGHT, OF NEW VIENNA, OHIO.

Letters Patent No. 65,522, dated June 4, 1867.

---

IMPROVEMENT IN BEE-HIVES.

---

The Schedule referred to in these Letters Patent and making part of the same.

---

TO ALL WHOM IT MAY CONCERN:

Be it known that I, A. T. WRIGHT, of New Vienna, county of Clinton, and State of Ohio, have invented certain new and useful improvements in "Bee-Hives;" and do hereby declare that the following is a full, clear, and exact description thereof, reference being had to the annexed drawings, and the letters of reference marked thereon, making a part of this specification.

Figure 1 represents a longitudinal vertical section.

Figure 2 a side view of the honey and brood-frames, showing their construction in part, together with the modes of connection and clamping.

Figure 3, a plan view of a section of the honey-frames and adjusting-board, and a view of the triangular strips $a^3$.

Figure 4, an upright view of a honey-frame, showing its construction.

Figure 5, the ventilating device, as seen at $b$, fig. 1.

Figure 6, another construction of the ventilating device as applied to the lower portion of hive constructed on the same principle, but different in form to that seen in fig. 1; and Figure 7, a feed-box suitable for one form of bee-hive, on the principle to be hereinafter more fully specified.

In the annexed drawings, making a part of this specification, A B C in fig. 1 represent the three distinct exterior sections of which one of the forms of my bee-hive is constructed. I do not wish to confine myself to this or any other peculiar or particular form, but use this form in the present instance for the purpose of specifying my invention. It will be observed that section A is the foundation upon which the superstructure is built. This section is either made oblong or square, and is provided with suitable feet $a\ a$, above which are placed rubber pads $x\ x$, to prevent jostling in shipping, and to act as springs to the hive. These may or may not be dispensed with when the hive is stationed on the apiarist's premises, as may be desired. The upper and outer portions of this section $m^2\ m^2$ slightly overlap the uprights, and form an inclined surface to convey water from the hive, while the centre top portions, being entirely covered by section B, are made convex, as shown in the drawings. Section B has neither cover nor floor, but is so constructed as to fit snugly upon the top of section A, and allow the top section C to fit neatly upon it. Any suitable style of connection may be used in the adjustment of the three sections one upon another. I do not wish to confine myself to any limited number of sections; nor do I wish to be understood as confining myself, either, to a convex-shaped roof, as I use both the flat and convex roof in the practical application of the hive. In the lower section A there is an inclined board, which extends from the convexity of the top to the outer edge of the stand at its bottom. This is what I term an "alighting-board," and upon which the bees may or may not light. There is a small opening, $z^2$, near the convexity of the inclined boards of section A, through which the bees can pass after lighting upon the board. D represents a feed-box, which has suitable partitions, and which rests upon triangular-shaped boards, rabbeted, and near the alighting-board. This feed-box has a float in each partition to prevent the drowning of the bees in the molasses, water, or other liquid food placed in the box. These floats $d$ are merely strips of wood, connected by a piece at each end, having a space between each strip. Another form of feed-box is shown in fig. 7. This box has partitions, and has a lid with a gutter left in its centre, directly under which is placed a wire screen to admit the food passing into the box. In fig. 1 an opening is shown at $y^2$ for the purpose of dropping food into the feed-box D and securing upward ventilation. A wire screen is seen under this opening for preventing passage of the bees. E represents a receptacle, left in section A to place the surplus-honey boxes, or any other article that is desired to be stored, either in shipping or when the hive is stationary. F and F' represent the two sets of brood and honey-frames and boxes when clamped together and ready for insertion within the exteriors B C. I may use an unlimited number of these frames, and have them perfectly and safely clamped together either for shipping or stationary use. The frames R are usually used as brood-frames, but can be used for either brood or honey-frames. These frames R are not connected at the bottoms, but are frames composed of three pieces and an additional intermediate stay, $n$, fig. 2. The top connections of each are square bars placed so that they have one edge projecting downwards, ($m$,) as is the case with the stays $n$, so that the bees build their combs from the edge of these bars instead of their surfaces. It is to be observed that the stays $n$ act for the twofold purpose of supporting the combs and strengthening the frames. R' represents the honey-frames. These frames are composed of four pieces—the top, bottom, and two sides. The top pieces are made in a triangular form, so that the edge projects down for the bees to build their combs from, ($p$,) while the bottom connecting pieces are not placed flush against each other when on the brood-frames, allowing a space for the bees to pass, ($s$.) I may place the honey-boxes in the same set with the brood-boxes for the purpose of inducing the bees to produce their honey sooner than otherwise. I also may place honey-frames at each end of the brood-frames, as shown in the drawings, fig. 2. Fig. 3 of annexed drawings shows the top of the case or set F, with the triangular-shaped bars placed upon and between the convexities of the bars $m$. These pieces are made so that their convexities fit snugly within the concavities formed by the top bars of two brood-frames coming together. In some instances I construct the bars slightly different by taking off the top edge or surface, and having them assume the shape somewhat as seen at $m^1$, fig. 2, but always allow an edge extending below. $t$ represents one of the partitions I use between the frames. These partitions are constructed of a single thin piece of wood, with a narrow strip tacked on each of three sides at its outer surfaces, as seen at 4–5 in fig. 4. These partitions may or may not be placed between each honey-frame, and cause the bees to build their combs perfectly straight in their frames. One of these partitions is seen in the brood-frame set in fig. 2. The sets of frames F and F' are suitably clamped together in the following form, but may be clamped in any other suitable form that is desired: G and G' represent the two side bars, having a series of perforations in them ($z$) for their adjustability. These pieces rest upon strips K K, which are secured at each end of the frames, and provided with pins $e$, which secure the pieces G as well as acting as springs. L represents the bars, which are provided with tenons $y\,y$ at each of their ends, and which tenons are placed eccentrically for the purpose of adjusting the frames when passed into any of the openings $z$ of the pieces G. These eccentric-bars L may be either of a round or square form, and effectually tighten the frames by merely turning them upon their tenons to allow the wide or narrow surface to press against the end pieces of the frames. I also use another description of clamping, which is somewhat similar to the one described: It is by the use of the pins on the pieces K, to pass into vertical openings on bars similar to the ones shown at G, and also by stirrups fitting into notches in the said bars. I I' represent wedges, which tighten the clamps when becoming loose. By a clamping device, substantially as shown, any one of the frames may be extracted from the set and the remainder immediately clamped together without much time or labor. N represents a clamp for connecting the sets of frames on each side, and forming, as it were, the sets F and F' into one. These clamps may be tightened by a suitable wedge, $f$, or otherwise. $g$ represents ear projections, which are for the purpose of connecting and supporting the frame and the side pieces G and G'. O represents dividing-boards for the different colonies. These boards may or may not be perforated to allow the bees to pass, and to secure a perfect ventilation in the hive. It will be seen in fig. 1 that there is an air-space all around the brood and honey-boxes to secure a ventilation, which is a very important feature in bee-keeping. The screens $h\,h$ allow the air to pass freely around and into the hive. Fig. 6 represents a device used for this purpose, and which I usually apply to my hives. $q\,q\,q$ represent projections, to use in handling the honey-frames, and nails connecting them. Fig. 5 represents a door, used in the hive shown in fig. 1, with the button $b$ for securing a covering to the screen.

In the cheap form of bee-hives on my principle, I merely use a flat surface for a base, with the frames upon it elevated from the said base by strips or cleats, leaving a space for the bees to freely pass.

In Figure 9, an end view of the bee-hive stand is shown, with the boards $a'$ forming the concavity, and leaving the opening $z^2$, fig. 1, for the passage of bees, and the plug or piece $y^3$ placed within the said opening, also the board $b^2$ heretofore referred to. It will be observed that the alighting-board overlaps the board $a'$ on one side, and that the end of the opposite board $a'$ is bevelled at one edge to allow free access for the bees. If otherwise there would not be sufficient room for them to pass. The plug $y^3$ may extend the entire length of the opening $z^2$, or partially, as required for the ingress or egress of the different colonies of bees, and by means of the transverse boards and openings at each end the particular colony of bees may pass out or in, or may be confined in their hive. $h^2$ is a peculiarly cut bar, which is placed above the boards $a'$ and $b^2$, and by its construction effectually shields the hive and bees from the inclemency of weather. This board is bevelled its entire length on its under side, so that it does not interfere with the ventilating orifice in any manner. In referring to the feed-box H, fig. 7, it will be seen that cleats are also nailed to its four corners for the purposes heretofore set forth, and can be used in any position of any of the sets of frames herein described. The partitions $t$ are devices of much importance in the practice of bee-keeping. By means of the strips upon their outer surfaces, they are designed to serve as guides for the bees in building their combs, and when used with a horizontal hive-stand serve as partitions to separate the board from the honey frames. In clamping the frames together, I have oftentimes found the use of an ordinary hand-screw to be very valuable and efficient, and believe it to be one of the best modes of clamping the frames. At the top of the section A there are strips of wood which pass around the top and upon the boards $m^2$, as seen at $l^2\,l^2$, and by this means form the water-conveyers into lighting-boards for the bees. These strips may or may not be dispensed with, as required. Under the receptacle E there is a floor, which has strips tacked on its under side to prevent warping, and assist in strengthening the same, when supported by its cross-pieces as seen at $c^1\,c^2$, in fig. 1, and is removable or adjustable. In making the partitions $t$ for a horizontal-bottom stand, I necessarily leave or cut out a portion to allow the bees to pass through. In the concavity of section A there are small strips placed in the opening $z^2$ to cut off the communication between the different bee colonies. The strips on each edge (4–5) of the partition boards $t$, as shown in fig. 4 and fig. 2, cause the bees to build their combs so that when said boards $t$ are removed, the combs will have about the same space between them after the frames are re-clamped together as if they had not been used, at the same time securing the combs perfectly straight and of even thickness in their respective frames.

Strips equivalent to the ones on the partitions are also used by me upon the dividing boards O. These strips prevent the killing of bees which would otherwise occur by using the two flat surfaces of the boards.

Figure 10 represents an end view of the feed-box H, which is also provided with the narrow strips on its edges, and used for the purposes heretofore described. W represents the lid to box H, which lid has a cleat nailed under each end, $v'$, for the purpose of elevating the side of said lid from the box to allow the bees a free passage when feeding. Fig. 5 is a side view of the combined ventilator, shutter, and passage regulator, which is placed in the position before described, the screen of which is covered by a suitable door or shutter, seen in the figs. 1, 2, 3, in dotted lines. By sliding the button $b$, a passage regulator is seen for the bees.

Having thus fully described my said invention, what I claim as new, and desire to secure by Letters Patent, is—

1. The honey-frames R, and brood-frames R', as constructed, when used in the manner herein specified, with the triangular strips $a^3$ for closing the openings between the frame sections F F', as set forth.

2. The combination and arrangement of the bars G, pieces K, and eccentrically tenoned blocks L, with the frame sections and connecting-boards N, as constructed, when used for the purposes set forth.

3. The frame section A, having a concavity, $a$ $a'$, at its top, slanting board $b^2$, and receptacle for feed-box D, ventilating screens $h$ and $e$, with door $b$, and adjustable bottom $c^1$ $c^2$, when constructed and arranged in the manner and for the purposes specified.

4. Providing the under part of the bee-hive stand with rubber bands $x$, or their equivalents, in the manner substantially as specified and for the purposes set forth.

5. The feed-box H, constructed as herein specified, having a lid with screen $w$, and cleats on its under side for allowing a space between the said lid and the box for the egress and ingress of the bees, as specified.

In testimony that I claim the foregoing I have hereunto set my hand this 22d day of November, 1866.

A. T. WRIGHT

Witnesses:
   C. M. ALEXANDER,
   J. M. MASON.